United States Patent [19]

Okano et al.

[11] Patent Number: 4,733,279
[45] Date of Patent: Mar. 22, 1988

[54] MICROFILMING CAMERA

[75] Inventors: Takeshi Okano, Nishinomiya; Sadaaki Nakaoka, Osaka, both of Japan

[73] Assignee: Fuji Photo Film Co., Ltd., Kanagawa, Japan

[21] Appl. No.: 931,835

[22] Filed: Nov. 18, 1986

[30] Foreign Application Priority Data

Nov. 18, 1985 [JP] Japan .................... 60-177934[U]
Nov. 18, 1985 [JP] Japan .................... 60-259201

[51] Int. Cl.⁴ .................................. G03B 27/54
[52] U.S. Cl. ................................. 355/65; 355/70
[58] Field of Search ................. 355/65, 66, 67, 70

[56] References Cited

U.S. PATENT DOCUMENTS

| | | | |
|---|---|---|---|
| 3,592,544 | 7/1971 | Brendel | 355/70 |
| 3,669,538 | 6/1972 | Fowler | 355/70 |
| 3,777,135 | 12/1973 | Rees | 355/70 |
| 3,836,251 | 9/1974 | Hertel et al. | 355/70 |
| 3,850,523 | 11/1974 | Skavnak | 355/70 |

Primary Examiner—Donald A. Griffin
Attorney, Agent, or Firm—Sughrue, Mion, Zinn, Macpeak, and Seas

[57] ABSTRACT

A microfilming camera for taking an microimage of a document on a film. The microfilming camera comprises a main mirror disposed beneath a transparent document support for the support thereon of a document to be microfilmed, which main mirror is used to deflect the optical path of a photo-taking system, a side mirror disposed on each side of the space delimited between the document support and the main mirror, and illuminating sources positioned exteriorly of the optical path and disposed in face-to-face relationship with the respective side mirrors.

5 Claims, 6 Drawing Figures

MICROFILMING CAMERA

BACKGROUND OF THE INVENTION

1. Field of Technology

The present invention generally relates to a microfilming camera assembly and, more particularly, to an illuminator used therein for illuminating a document to be microfilmed.

2. Description of the Prior Art

The microfilming camera assembly is now made available generally in two types. One is referred to as a "flatbed" type, or possibly an overhead type, wherein, while a photographic camera is mounted overhead the document support for the support thereon of a document to be microfilmed, an illuminator lamp is supported on each side of the document support for illuminating the document placed on the document support, such as disclosed in, for example, U.S. Pat. Nos. 3,649,120 and 3,669,534. The other is referred to as an "Inverted-flatbed" type, or possibly a built-in type, wherein the illuminator lamp is supported on each side of the main mirror disposed beneath the transparent document support for deflecting the imagewise light, such as disclosed in, for example, U.S. Pat. Nos. 3,972,619 and 3,697,176.

The "flatbed", or overhead, type renders the microfilming camera assembly as a whole to be bulky, whereas the "Inverted-flatbed", or built-in, type requires an optical path of increased distance for minimizing an irregular illumination, the increased distance of the optical path in turn rendering the camera assembly as a whole to be bulky.

In any event, in both of these types, neither design nor device have hitherto been developed for maximizing the efficiency of use of light emanating from the illuminator lamps. Also, another problem arises that, if the illuminator optical path is shortened, the distribution of light used to illuminate the document to be microfilmed tends to become irregular.

SUMMARY OF THE INVENTION

The present invention has been developed with a view to eliminating the above discussed problems inherent in the prior art microfilming camera assemblies and has for its essential object to provide an improved illuminator built in the microfilming camera assembly, which is effective to make the camera assembly compact and wherein arrangement is made to increase the light collecting efficiency.

In order to accomplish the above described object of the present invention, there is provided an illuminator built in a microfilming camera assembly comprising a main mirror disposed beneath a transparent document support for the support thereon of a document to be microfilmed, which main mirror is used to deflect the optical path of a phototaking system. The illuminator comprises a side mirror disposed on each side of the space delimited between the document support and the main mirror, and illuminating sources positioned exteriorly of the optical path and disposed in face-to-face relationship with the respective side mirrors.

In this construction, rays of light emanating from the illuminating sources can be directed from the side mirrors towards the main mirror which in turn direct them towards the document support to illuminate the document placed on the document support.

With this construction, the illuminating sources can be positioned frontwardly of the main mirror and inwardly of the side mirrors with no possibility of mirror-reflection of respective images of the illuminating sources, and therefore, a sufficient optical path for the illuminating light can be secured, making it possible to render the camera assembly as a whole to be compact.

Preferably, each of the illuminating sources comprises an illuminating lamp having a built-in filament, and a light collecting reflector block. The light collecting reflector block includes an upper arcuate reflector arcuately curved about the filament of the illuminator lamp, a side arcuate reflector and a side Fresnel reflector both continued downward from the upper arcuate reflector, a side flat reflector positioned below the side Fresnel reflector, and a lower flat reflector continued from the side flat reflector towards a position below the illuminator lamp.

With each of the illuminating sources preferably so constructed as hereinabove described, since the various reflectors of the light collecting reflector block having its inner surface formed into a light correcting mirror of a predetermined shape are used to reflect rays of light so as to converge them in readiness for the illumination of the document, the rays of light emitted from the respective illuminator lamp can be efficiently utilized as the illuminating light, and therefore, the light collecting efficiency can be increased.

Also, since the sectional shape of the light collecting reflector block is fixed, the light collecting reflector block can be manufactured by the use of a drawn material, and therefore, not only can the productivity be increased, but also the optical adjustment can readily be accomplished.

The distribution of light used to illuminate the document placed on the document support can be advantageously adjusted by adjusting the angle of the side flat reflector and/or the shape of serrations of the side Fresnel reflector.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
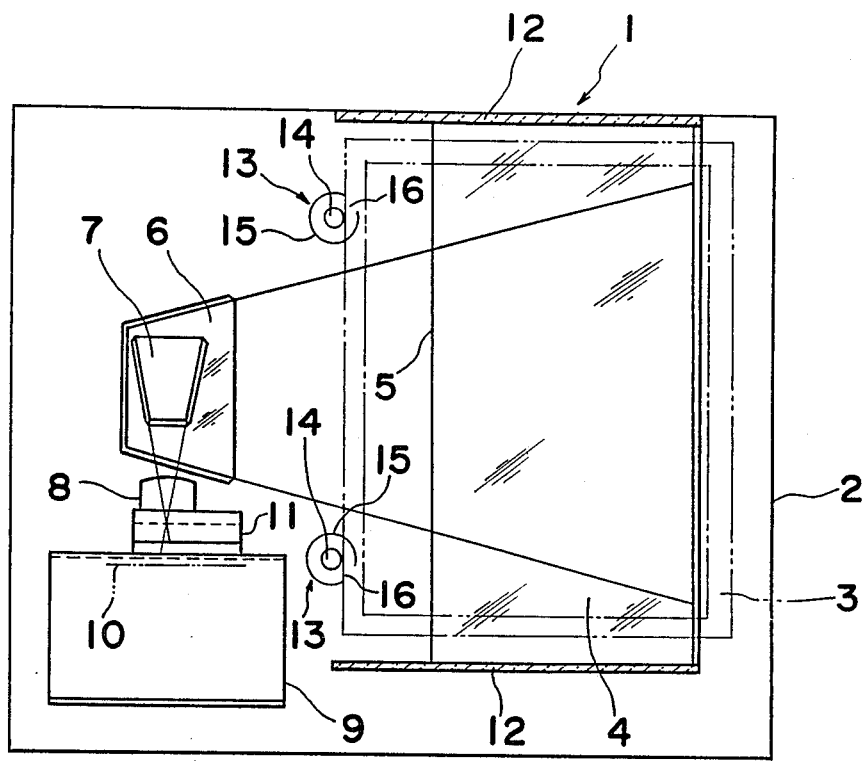
FIG. 1 is a schematic top plan view of a microfilming camera assembly embodying the present invention.
Figure 2:
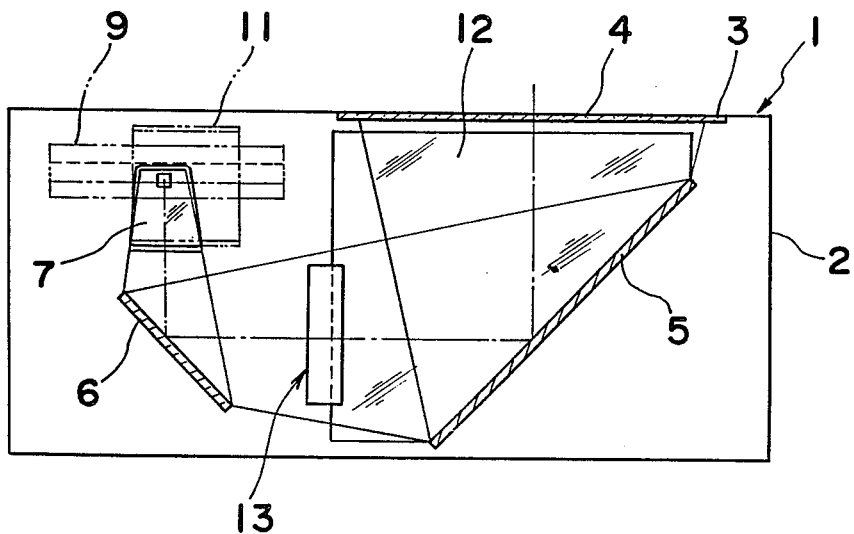
FIG. 2 is a front sectional view of FIG. 1.

Referring first ot FIGS. 1 and 2, a microfilming camera assembly 1 shown therein is of the "Inverted-flatbed", or built-in, type and comprises a camera casing 2 of generally rectangular box-like configuration having a transparent document support 4 mounted on top of the camera casing 2. The document support 4 may be a glass plate and has a rectangular white-colored frame 3 formed on a peripheral edge portion thereof.

The camera casing 2 has installed therein a main mirror 5 positioned below the document support 4 and inclined at a predetermined angle for bending the photo-taking optical path inwardly, a first auxiliary mirror 6 positioned in face-to-face relationship with the main mirror 5 for bending the photo-taking optical path upwardly, a second auxiliary mirror 7 positioned in face-to-face relationship with the first auxiliary mirror 6 for bending the photo-taking optical path in a lateral direction, and a photo-taking structure 11 including a photo-taking lens assembly 8 positioned in face-to-face relationship with the second auxiliary mirror 7, said photo-taking structure being operable to take a photographic recording of an image of the document on an electrophotographic microfilm 10 enclosed within a microfilm cassette 9. It is to be noted that, in the practice of the present invention, the photo-taking structure 11 may be a processing head such as disclosed, for example in U.S. Pat. No. 4,600,291, and the microfilm cassette 9 utilizeable in the present invention may be a film cassette disclosed in, for example, U.S. Pat. No. 4,572,649.

The specific arrangement of the mirrors 5 to 7 as described above has made it possible to make the camera casing 2 in a generally flattened box-like configuration.

Also, within the camera casing 2, a pair of side mirrors 12 are positioned on respective sides of the space between the document support 4 and the main mirror 5 and in face-to-face relationship with each other for bending an illuminating optical path.

A pair of illuminators 13 are arranged frontwardly of the main mirror 5 so as to confront the respective side mirrors 12 and positioned inwardly between the side mirrors 12 and exteriorly of the photo-taking optical path.

The illuminators 13 are of identical construction, and each comprises a tubular illuminator lamp 14 and a light shielding cover 15 exteriorly surrounding the illuminator lamp 14. The light shielding cover 15 for each illuminator 13 has its interior surface formed as a light collecting mirror and also has a light projecting slit defined at 16 for projecting rays of light from the lamp 14 towards the adjacent side mirror 12 therethrough.

Figure 5:
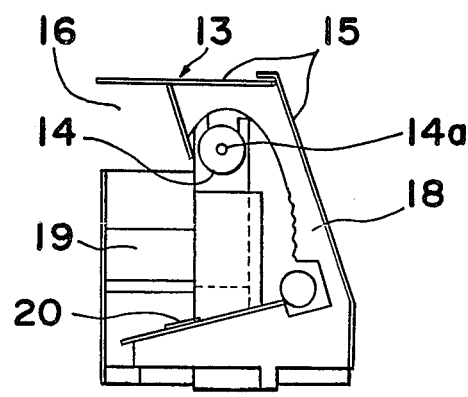
FIG. 5 is a side view of one of the illuminating sources.
Figure 6:
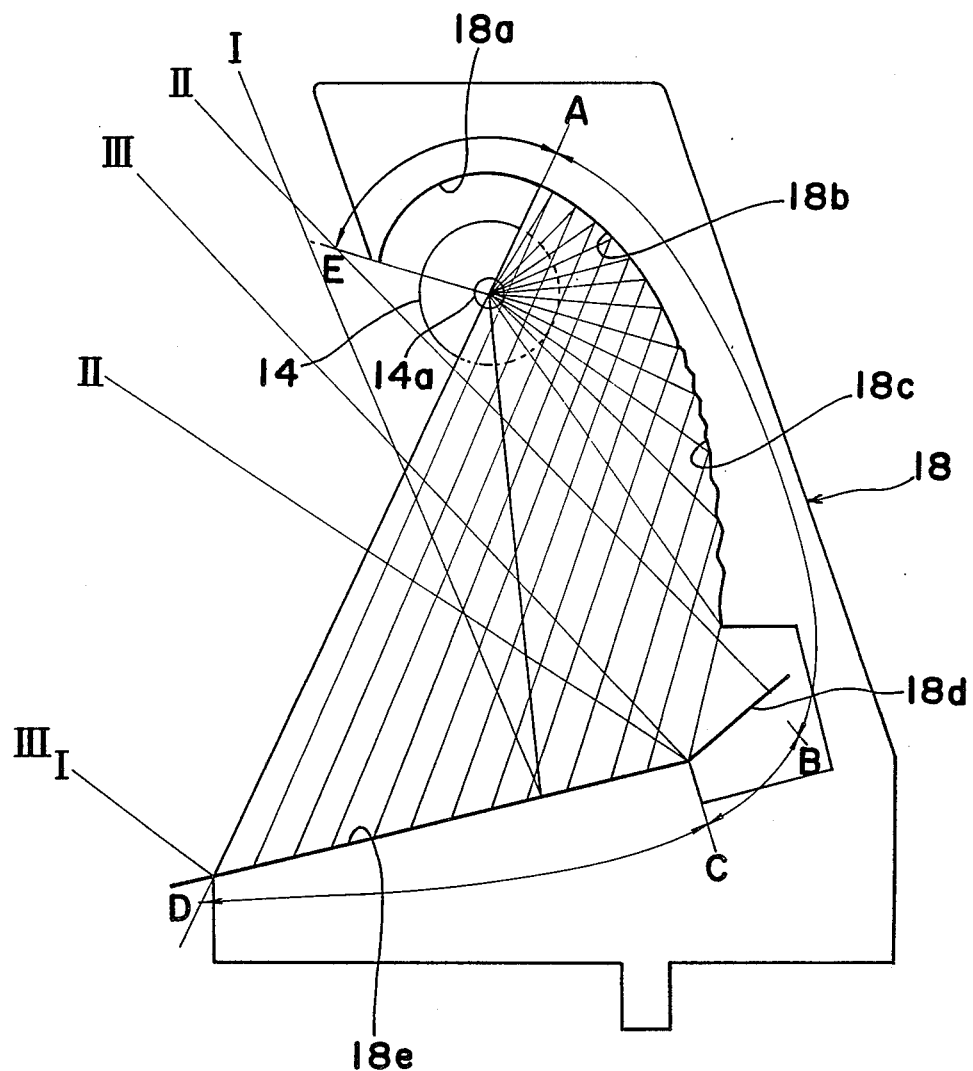
FIG. 6 is a side view, on an enlarged scale, of a light collecting reflector block.

The details of each of the illuminators 13 are best shown in FIGS. 5 and 6. As shown therein, each illuminator 13 comprises a light collecting reflector block 18 including an upper arcuate reflector 18a curved about a filament 14a of the tubular lamp 14, a side arcuate reflector 18b and a side Fresnel reflector 18c continued downwards from the upper arcuate reflector 18a, a side flat reflector 18d positioned below the side Fresnel reflector 18c, and a lower flat reflector 18e continued from the side flat reflector 18d so as to extend towards a position below the respective lamp 14, said light collecting reflector block 18 being enclosed by the light shielding cover 15 which has the light projecting slit 16 defined therein.

It is to be noted that the side flat reflector 18d is so supported that the angle of inclination thereof can be adjusted.

Accordingly, a bundle of rays of light emanating from the lamp 14 between points C and D is reflected by the lower flat reflector 18e thereby to form a bundle of light rays within the range I—I which is used to illuminate the document placed on the document support 14.

Similarly, a bundle of light rays between points B and C is reflected by the side flat reflector 18d thereby to form a bundle of light rays within the range of II—II, and a bundle of light rays between points A and B is guided by the side arcuate reflector 18d and the side Fresnel reflector 18c towards the lower flat reflector 18e to form a bundle of light rays within the range III—III, both of said light bundles within the respective ranges II—II and III—III being also used to illuminate the document on the document support 4.

A bundle of light rays between points A and E is reflected by the upper arcuate reflector 18a so as to join the above described illuminating light.

With each of the illuminators 13 having been constructed as hereinbefore described, the light collecting efficiency of the light collecting block 18 is high and, therefore, light emitted from the respective lamp 14 can be efficiently used as the illuminating light.

Also, since the light collecting reflector block 18 has a fixed sectional shape, it can be made of a drawn material, and therefore, not only can the productivity be increased, but also the optical adjustment can readily be accomplished.

Moreover, by the adjustment of the angle of inclination of the side flat reflector 18d and/or that of the shape of serrations of the side Fresnal reflector 18c, the distribution of illumination on the document support can be corrected.

It is to be noted, if an auxiliary reflective plate 19 is fitted to one or a plurality of appropriate portions of the light collecting reflector block 18, the intensity of illumination at a specific portion of the document on the document support can be increased with no need to increase the number of the lamps 14 and that, if a diffuser 20 is provided on an appropriate portion of the lower flat reflector 18c of the light collecting reflector block 18, the peak value of the distribution of illumination can be suppressed to permit the intensity of light used to illuminate a peripheral area of the document to be increased.

Figure 3:
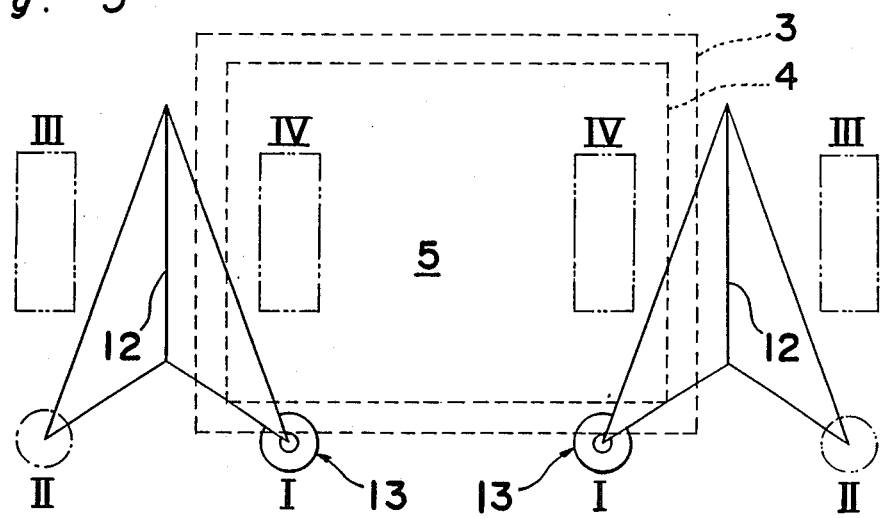
FIG. 3 is a top plan view of the camera assembly showing the optical path for the illuminating light.
Figure 4:
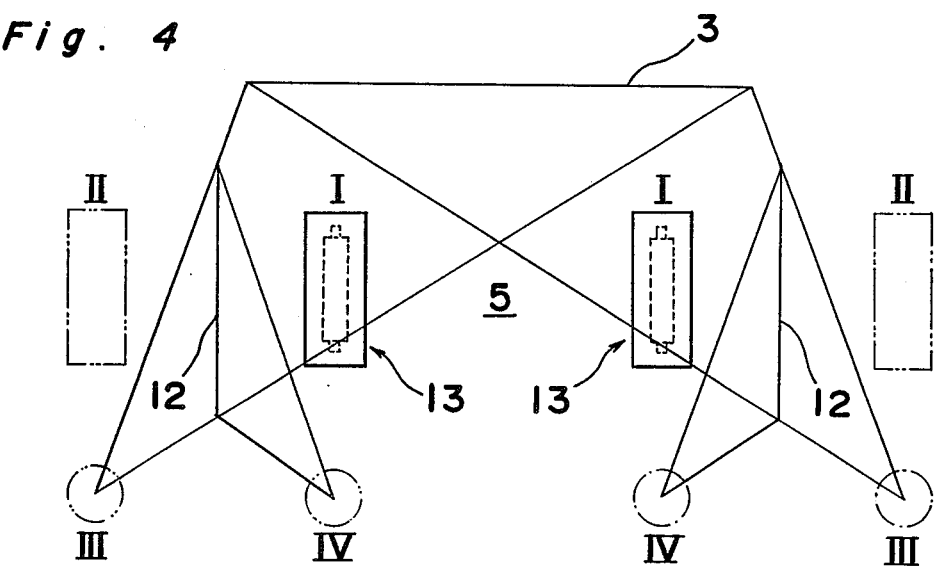
FIG. 4 is a front view of FIG. 3.

In the construction as hereinbefore decsribed, and referring now to FIGS. 3 and 4, while the illuminators 13 are in reality positioned at respective locations I, the side mirrors 12 permit the illuminators 13 to act as if they were positioned at respective locations II, when rays of light are projected onto the side mirrors 12 through the respective slits 16.

Similarly, the illuminators 13 are permitted by the main mirror 15 to act as if they were positioned at respective locations IV.

Accordingly, by virtue of these two phenomena, that is, since the illuminating light projected from the illuminators 13 are reflected by the side mirrors 12 and then by the main mirror 5, the illuminators 13 act as if they were positioned at respective locations III.

The locations III are ideal positions for the respective illuminators 13 where they would not bring about irregular illumination of the document placed on the document support.

From the foregoing, it has now become clear that, since the illuminators 13 are in reality located frontwardly of the main mirror 5 and inwardly between the side mirrors 12, the camera casing 2 can be made compact, and that, since by virtue of the mirrors 12 and 5 the illuminators 13 act as if they were placed at the respective locations III, the illuminating optical path can be sufficiently secured with no possibility of irregular illumination.

It is also clear that, since the three mirrors 5 and 12 surround the document support 4, a plurality of illuminating optical paths are formed between the illuminators 13 and the document support 4, the intensity of illuminating light can be increased.

Although the present invention has been fully described by way of example with reference to the accompanying drawings, it is to be noted here that various changes and modifications will be apparent to those skilled in the art. For example, although in the foregoing description reference has been made to the use of a film which is generally known as an electrophotographic microfilm, a silver haloid photographic film can be equally used in connection with the microfilming camera according to the present invention.

Therefore, unless otherwise such changes and modifications depart from the scope of the present invention, they should be construed as being included therein.

What is claimed is:

1. A microfilming camera comprising a main mirror disposed beneath a transparent document support for the support thereon of a document to be microfilmed, which main mirror is used to deflect the optical path of a photo-taking system, a side mirror disposed on each side of the space delimited between the document support and the main mriror, and illuminating sources positioned exteriorly of the optical path and disposed in face-to-face relationship with the respective side mirrors, inwardly of said side mirrors and forwardly of the main mirror, and light shields having internal mirror surfaces positioned about said illumination sources and limiting illumination therefrom to that in the direction of said side mirrors while preventing direct illumination of said main mirror whereby rays of light emanating from the illuminating sources are directed from the illuminating sources, first to the side mirrors and then towards the main mirror which in turn directs them towards the document support to illuminate the document placed on the document support eliminating the possibility of mirror reflection of respective images of the illuminating sources while creating an optical path of sufficient length for proper illumination of the document to be microfilmed while rendering the camera assembly as a whole compact.

2. The microfilming camera as claimed in claim 1, wherein each of the illuminating sources comprises an illuminator lamp having a built-in filament, said light shields each comprise a light collecting reflector block, said light collecting reflector block including an upper arcuate reflector arcuately curved about the filament of the illuminator lamp, a side arcuate reflector and a side Fresnel reflector both continued downward from the upper arcuate reflector, a side flat reflector positioned below the side Fresnel reflector, and a lower flat reflector continued from the side flat reflector towards a position below the illuminator lamp.

3. The microfilming camera as claimed in claim 1, wherein said light shields are cylindrical light shields which partially surround said illuminating sources, respectively to eliminate illumination from said illuminating sources in the direction of the side mirrors wherein, the interior surface of said cylindrical light shields constitute a first mirror, said respective side mirrors each constitute a second mirror and said main mirror constitutes a third mirror for light illuminating the document to be microfilmed, and wherein, said first mirror comprises a curved mirror and a Fresnel mirror.

4. The microfilming camera as claimed in claim 1, wherein said transparent document support is horizontal, said main mirror is disposed beneath said transparent document support and is oblique to the plane thereof, said side mirrors are disposed vertically to respective side of the main mirror, said illuminating sources are at right angles to the transparent document support exterior of the optical path, are elongated in a direction parallel to the side edges of the side mirrors, said light shields constitute cylindrical members having a narrow longitudinal slit at a circumferential position such that light emanating from the illuminating sources is directed through the narrow longitudinal slit towards the side mirrors and wherein, the interior surface of the light shielding cover constitutes a first mirror for reflecting light emanating from said illuminating sources interior of the light shielding cover through said slit thereby concentrating the light emanating from the illuminating sources prior to projection from the slits onto the surfaces of respective side mirrors for enhancing the illumination of the document to be microfilmed.

5. A microfilming camera comprising a main mirror disposed beneath a transparent document support for the support thereon of a document to be microfilmed, which main mirror is used to deflect the optical path of a photo-taking system, a side mirror disposed on each side of the space delimited between the document support and the main mirror, an illuminating sources positioned exteriorly of the optical path and disposed in face-to-face relationship with the respective side mirrors, whereby rays of light emanating from the illuminating sources are directed from the illuminating sources to the side mirrors and then towards the main mirror which in turn directs them towards the document support to illuminate the document placed on the document support, wherein each of the illuminating sources comprises an illuminating lamp having a built-in filament, and a light collecting reflector block, said light collecting reflector block including an upper arcuate reflector arcuately curved about the filament of the illuminator lamp, a side arcuate reflector and a side Fresnel reflector both continued downward from the upper arcuate reflector, a side flat reflector positioned below the side Fresnel reflector, and a lower flat reflector continued from the side flat reflector towards a position below the illuminator lamp.

* * * * *